United States Patent
Dettinger et al.

(10) Patent No.: US 8,214,351 B2
(45) Date of Patent: Jul. 3, 2012

(54) SELECTING RULES ENGINES FOR PROCESSING ABSTRACT RULES BASED ON FUNCTIONALITY AND COST

(75) Inventors: Richard D. Dettinger, Rochester, MN (US); Frederick A. Kulack, Rochester, MN (US); Xueyun S. Wang, San Jose, CA (US); Shannon E. Wenzel, Colby, WI (US)

(73) Assignee: International Business Machines Corporation, Armonk, NY (US)

( * ) Notice: Subject to any disclaimer, the term of this patent is extended or adjusted under 35 U.S.C. 154(b) by 594 days.

(21) Appl. No.: 11/735,532

(22) Filed: Apr. 16, 2007

(65) Prior Publication Data

US 2008/0256047 A1    Oct. 16, 2008

(51) Int. Cl.
*G06F 17/30* (2006.01)
(52) U.S. Cl. ........................................ 707/713
(58) Field of Classification Search ............... 707/4, 713
See application file for complete search history.

(56) References Cited

U.S. PATENT DOCUMENTS

| | | | |
|---|---|---|---|
| 5,471,611 A | 11/1995 | McGregor | |
| 6,442,543 B1 | 8/2002 | Snodgrass et al. | |
| 6,601,065 B1 | 7/2003 | Nelson et al. | |
| 6,732,092 B2 | 5/2004 | Lucas et al. | |
| 6,820,076 B2 | 11/2004 | Bailey et al. | |
| 6,996,558 B2 | 2/2006 | Dettinger et al. | |
| 2003/0167274 A1 | 9/2003 | Dettinger et al. | |
| 2003/0169284 A1 | 9/2003 | Dettinger et al. | |
| 2003/0172056 A1 | 9/2003 | Dettinger et al. | |
| 2004/0148278 A1 | 7/2004 | Milo et al. | |
| 2004/0267760 A1 | 12/2004 | Brundage et al. | |
| 2005/0071222 A1 | 3/2005 | Bigus et al. | |
| 2006/0009991 A1* | 1/2006 | Jeng et al. | 705/1 |
| 2006/0122993 A1* | 6/2006 | Dettinger et al. | 707/4 |
| 2007/0067371 A1 | 3/2007 | Allan et al. | |
| 2007/0100812 A1* | 5/2007 | Simske et al. | 707/5 |

OTHER PUBLICATIONS

A Predicate Matching Algorithm for Database Rule Systems, 1990, AMC, pp. 271-272.*
U.S. Appl. No. 11/272,583, entitled "Abstract Rule Sets," filed Nov. 10, 2005.
Llama, "Search Your Database", Jan. 18, 2002, Codewalkers, pp. 1-4.
Meng, Weiyi, et al, "A Theory of Translation From Relational Queries to Hierarchical Queries" Apr. 1995, IEEE, pp. 228-245.

* cited by examiner

*Primary Examiner* — James Trujillo
*Assistant Examiner* — Amresh Singh
(74) *Attorney, Agent, or Firm* — Patterson & Sheridan LLP

(57) ABSTRACT

Embodiments of the invention provide techniques for selecting rule engines for processing abstract rules based on functionality and cost. In general, an abstract rule is analyzed to determine which functions are required to process the rule. The abstract rule is assigned to a rule engine by evaluating metadata describing the functions and costs of the rule engines. The abstract rule is then translated to the format required by the selected rule engine.

24 Claims, 7 Drawing Sheets

SELECTING RULES ENGINES FOR PROCESSING ABSTRACT RULES BASED ON FUNCTIONALITY AND COST

CROSS-REFERENCE TO RELATED APPLICATIONS

This application is related to U.S. patent application Ser. No. 11/272,583, entitled "Abstract Rule Sets," filed Nov. 10, 2005. This related patent application is herein incorporated by reference in its entirety. Further, this application is related to commonly assigned U.S. Pat. No. 6,996,558, issued Feb. 7, 2006, entitled "Application Portability and Extensibility through Database Schema and Query Abstraction," which is incorporated by reference herein in its entirety. Furthermore, this application is related to commonly assigned, co-pending U.S. patent application Ser. No. 11/005,418, entitled "Abstract Query Plan," filed Dec. 6, 2004.

BACKGROUND OF THE INVENTION

1. Field of the Invention

The invention generally relates to computer database systems. More particularly, the invention relates to techniques for selecting rule engines for processing abstract rule sets.

2. Description of the Related Art

Databases are well known systems for storing, searching, and retrieving information stored in a computer. The most prevalent type of database used today is the relational database, which stores data using a set of tables that may be reorganized and accessed in a number of different ways. Users access information in relational databases using a relational database management system (DBMS).

Each table in a relational database includes a set of one or more columns. Each column typically specifies a name and a data type (e.g., integer, float, string, etc), and may be used to store a common element of data. For example, in a table storing data about patients treated at a hospital, each patient might be referenced using a patient identification number stored in a "patient ID" column. Reading across the rows of such a table would provide data about a particular patient. Tables that share at least one attribute in common are said to be "related." Further, tables without a common attribute may be related through other tables that do share common attributes. A path between two tables is often referred to as a "join," and columns from tables related through a join may be combined to from a new table returned as a set of query results.

Queries of a relational database may specify which columns to retrieve data from, how to join the columns together, and conditions (predicates) that must be satisfied for a particular data item to be included in a query result table. Current relational databases require that queries be composed in complex query languages. Today, the most widely used query language is Structured Query Language (SQL). However, other query languages are also used. A SQL query is composed from one or more clauses set off by a keyword. Well-known SQL keywords include the SELECT, WHERE, FROM, HAVING, ORDER BY, and GROUP BY keywords. Composing a proper SQL query requires that a user understand both the structure and content of the relational database as well as the complex syntax of the SQL query language (or other query language). The complexity of constructing an SQL statement, however, generally makes it difficult for average users to compose queries of a relational database.

Because of this complexity, users often turn to database query applications to assist them in composing queries of a database. One technique for managing the complexity of a relational database, and the SQL query language, is to use database abstraction techniques. Commonly assigned U.S. Pat. No. 6,996,558, entitled "Application Portability and Extensibility through Database Schema and Query Abstraction," discloses techniques for constructing a database abstraction model over an underlying physical database.

U.S. Pat. No. 6,996,558 discloses embodiments of a database abstraction model constructed from logical fields that map to data stored in the underlying physical database. Each logical field defines an access method that specifies a location (i.e., a table and column) in the underlying database from which to retrieve data. Users compose an abstract query by selecting logical fields and specifying conditions. The operators available for composing conditions in an abstract query generally include the same operators available in SQL (e.g., comparison operators such as =, >, <, >=, and, <=, and logical operators such as AND, OR, and NOT). Data is retrieved from the physical database by generating a resolved query (e.g., an SQL statement) from the abstract query. Because the database abstraction model is tied to neither the syntax nor the semantics of the physical database, additional capabilities may be provided by the database abstraction model without having to modify the underlying database. Thus, the database abstraction model provides a platform for additional enhancements that allow users to compose meaningful queries easily, without having to disturb existing database installations.

Data that is collected and stored in a database can be used as input to analysis routines for various purposes, including know-how management, decision making and statistical analysis. For instance, in a broad variety of applications, analysis routines are executed on query results obtained by executing corresponding queries against an underlying database.

Analysis routines can be defined by rule sets including one or more rules, each having predicates and actions. Commonly, the rules will have the structure "IF [predicate] THEN [action]." A rule predicate is a conditional statement evaluated in a rule engine. If the predicate is satisfied (i.e., the condition is met), then the associated rule action is executed. In other words, a set of rules can be used to implement an analysis routine, and a rule engine can evaluate predicates and fire or execute actions defined in the rules. Where actions of rules are defined to provide recommendations for users, such as treatment recommendations for doctors in medical institutions, the rules can be defined such that corresponding predicates reflect expert-based knowledge of possible diagnoses and evaluations of patient conditions. In other words, rules can be implemented to assist doctors by making diagnosis recommendations, drug recommendations, providing reminders of required verifications and checks, etc.

However, the creation of rules is generally a complex and difficult process which requires detailed knowledge of a corresponding database(s). More specifically, for each predicate and each action of the given rule that the user wants to create, the user requires an understanding of the database schema in order to look up a corresponding column name in the underlying database table(s). One technique for managing the creation of rules is to use abstract rule sets. Commonly assigned U.S. application Ser. No. 11/272,583 (hereafter "the '583 application"), entitled "Abstract Rule Sets," discloses techniques for using abstract rule sets.

The '583 application discloses that abstract rules must be translated into an executable form that can be processed by the rule engine. Each rule engine includes functions for processing the executable rules. For example, a rule having the predicate "If AVG (level)>40 . . . " requires that the rule engine include the statistical function "AVG," or average. Thus, if a rule engine does not include a function required to process a given rule, that rule cannot be processed on that rule engine.

In some situations, a variety of rule engines may be available to analyze the rule sets. The rule engines may differ in functionality. For example, a rule engine that is specialized for statistical analysis may not include fuzzy logic functions. On other hand, a rule engine that is specialized for artificial intelligence analysis may include fuzzy logic functions, but may not include statistical analysis functions.

In addition, the rule engines can differ in the cost to perform a particular function. For example, a rule engine that is developed internally by a company may not have any cost associated with its use. However, rule engines may also be purchased from vendors with different licensing and cost arrangements. For example, one rule engine may be purchased with an enterprise license that allows unlimited use of all included functions by all employees of a company for a flat fee. Another rule engine may be purchased with a per user license that allows the use of all included functions for a maximum of five concurrent users at a time. Yet another rule engine may be purchased on a Software As A Service (SAAS) basis, in which functions on a remote hosted system are used as required, and the cost is assessed for each use. Yet another rule engine may be purchased with costs based on Central Processing Unit (CPU) utilization. Yet another rule engine may be purchased with varying costs for the different included functions. Because of these differences between various rule engines, it may be desirable to select different rule engines depending on circumstances around a particular need.

Therefore, there is a need for techniques for selecting rule engines for processing abstract rules based on functionality and cost.

SUMMARY OF THE INVENTION

The invention generally relates to computer database systems. More particularly, the invention relates to techniques for selecting rule engines for processing abstract rule sets.

One embodiment provides a computer-implemented method of selecting a rule engine for processing an abstract rule, comprising: receiving an abstract rule having a conditional statement and a consequential statement; wherein the consequential statement defines a particular recommendation that is returned when the conditional statement is satisfied; wherein the conditional statement and the consequential statement are defined using logical field definitions defined in an abstraction model that models underlying physical data in a manner making a schema of the physical data transparent to a user of the abstraction model; determining the functions required to evaluate the conditional statement; determining which one or more rule engines of a plurality of rule engines include the required functions; and selecting, from the one or more rule engines determined to include the required functions, a rule engine to process the abstract rule.

Another embodiment provides a computer-implemented method of selecting rule engines for processing an abstract rule, comprising: receiving an abstract rule having a conditional statement and a consequential statement; wherein the consequential statement defines a particular recommendation that is returned when the conditional statement is satisfied; wherein the conditional statement and the consequential statement are defined using logical field definitions defined in an abstraction model that models underlying physical data in a manner making a schema of the physical data transparent to a user of the abstraction model; determining the functions required to evaluate the conditional statement; determining which one or more rule engines of a plurality of rule engines include the required functions; grouping the required functions into two or more groupings; and selecting, from the one or more rule engines determined to include the required functions, a rule engine to process each grouping of functions.

Yet another embodiment provides a computer readable storage medium containing a program which, when executed, performs an operation, comprising: receiving an abstract rule having a conditional statement and a consequential statement; wherein the consequential statement defines a particular recommendation that is returned when the conditional statement is satisfied; wherein the conditional statement and the consequential statement are defined using logical field definitions defined in an abstraction model that models underlying physical data in a manner making a schema of the physical data transparent to a user of the abstraction model; determining the functions required to evaluate the conditional statement; determining which one or more rule engines of a plurality of rule engines include the required functions; and selecting, from the one or more rule engines determined to include the required functions, a rule engine to process the abstract rule.

Yet another embodiment provides a computer readable storage medium containing a program which, when executed, performs an operation, comprising: receiving an abstract rule having a conditional statement and a consequential statement; wherein the consequential statement defines a particular recommendation that is returned when the conditional statement is satisfied; wherein the conditional statement and the consequential statement are defined using logical field definitions defined in an abstraction model that models underlying physical data in a manner making a schema of the physical data transparent to a user of the abstraction model; determining the functions required to evaluate the conditional statement; determining which one or more rule engines of a plurality of rule engines include the required functions; grouping the functions required to evaluate the conditional statement into two or more groupings; and selecting, from the one or more rule engines that include the required functions, a rule engine to process each grouping of functions.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
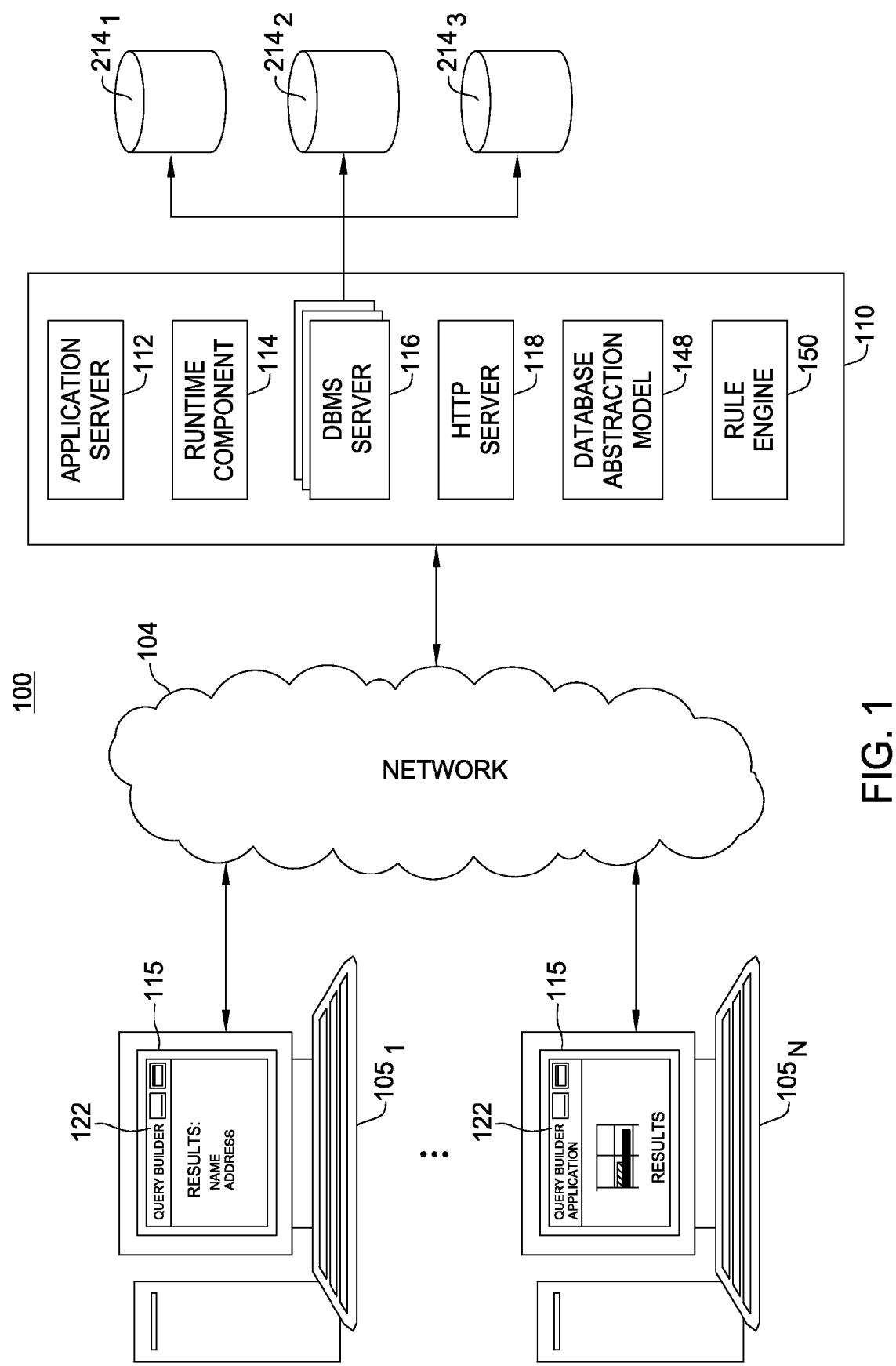
FIG. 1 is a block diagram illustrating a network environment, according to one embodiment of the invention.

Embodiments of the invention provide techniques for selecting rule engines for processing abstract rules based on functionality and cost. In general, an abstract rule is analyzed to determine which functions are required to process the rule. The abstract rule is assigned to a rule engine by evaluating metadata describing the functions and costs of the rule engines. The abstract rule is then translated to the format required by the selected rule engine.

In one embodiment, the rule engine selection may include consideration of performance metrics. For example, if two rule engines can perform a function, and the less costly rule engine is at full capacity, the more expensive rule engine may be selected. In another embodiment, an abstract rule may be split into sub-rules. Each sub-rule is made up of functions that are optimally processed by a given rule engine. The sub-rules are processed in order so that the output of one sub-rule is subsequently used as an input for processing another sub-rule. In this way, the abstract rule can be processed in multiple steps, with each step processed in a separate rule engine, but resulting in the same output as if the abstract rule was processed by a single rule engine.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system such as, for example, the network environment 100 shown in FIG. 1 and described below. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates a network environment 100 using a client-server configuration. Client computer systems $105_{1-N}$ include an interface that enables network communications with other systems over network 104. The network 104 may be a local area network where both the client system 105 and server system 110 reside in the same general location, or may be network connections between geographically distributed systems, including network connections over the Internet. Client system 105 generally includes a central processing unit (CPU) connected by a bus to memory and storage (not shown). Each client system 105 is typically running an operating system configured to manage interaction between the computer hardware and the higher-level software applications running on the client system 105 (e.g., a Lin® distribution, a version of the Microsoft Windows® operating system IBM's AIX® or OS/400®, FreeBSD, and the like). ("Linux" is a registered trademark of Linus Torvalds in the United States and other countries.)

The server system 110 may include hardware components similar to those used by the client system 105. Accordingly, the server system 110 generally includes a CPU, a memory, and a storage device, coupled by a bus (not shown). The server system 110 is also running an operating system, (e.g., a Linux® distribution, Microsoft Windows®, IBM's OS/400® or AIX®, FreeBSD, and the like).

The network environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

In one embodiment, users interact with the server system 110 using a graphical user interface (GUI) provided by a user interface 115. In a particular embodiment, GUI content may comprise HTML documents (i.e., web-pages) rendered on a client computer system 105₁ using web-browser 122. In such an embodiment, the server system 110 includes a Hypertext Transfer Protocol (HTTP) server 118 (e.g., a web server such as the open source Apache web-server program or IBM's Web Sphere® program) configured to respond to HTTP requests from the client system 105 and to transmit HTML documents to client system 105. The web-pages themselves may be static documents stored on server system 110 or generated dynamically using application server 112 interacting with web-server 118 to service HTTP requests. Alternatively, client application 120 may comprise a database front-end, or query application program running on client system 105ₙ. The web-browser 122 and application 120 may be configured to allow a user to compose an abstract query, and to submit the query to the runtime component 114 for processing.

As illustrated in FIG. 1, server system 110 may further include a runtime component 114, a database management system (DBMS) 116, a database abstraction model 148, and a rule engine 150. In one embodiment, these components may be provided using software applications executing on the server system 110. The DBMS 116 includes a software application configured to manage databases 214₁₋₃. That is, the DBMS 116 communicates with the underlying physical database system, and manages the physical database environment behind the database abstraction model 148. Users interact with the user interface 115 to compose and submit an abstract query to the runtime component 114 for processing.

In one embodiment, the runtime component 114 may be configured to receive an abstract query, and in response, to generate a "resolved" or "concrete" query that corresponds to the schema of underlying physical databases 214. For example, the runtime component 114 may be configured to generate one or more Structured Query Language (SQL) queries from an abstract query. The resolved queries generated by the runtime component 114 are supplied to DBMS 116 for execution. Additionally, the runtime component 114 may be configured to modify the resolved query with additional restrictions or conditions, based on the focus of the abstract query.

In one embodiment, the rule engine 150 represents one or more rule engines (i.e., inference engines) configured to carry out analysis routines for various purposes, including know-how management, decision making and statistical analysis. More specifically, the rule engine 150 can carry out analysis routines by processing rule sets including one or more rules, with each rule having predicates and actions. The rule engine 150 may be a software application installed on server 110. Alternatively, the rule engine 150 may be provided as "software as a service" (SAAS), wherein functions on a remote hosted system are accessed over a network as required.

Figure 2:
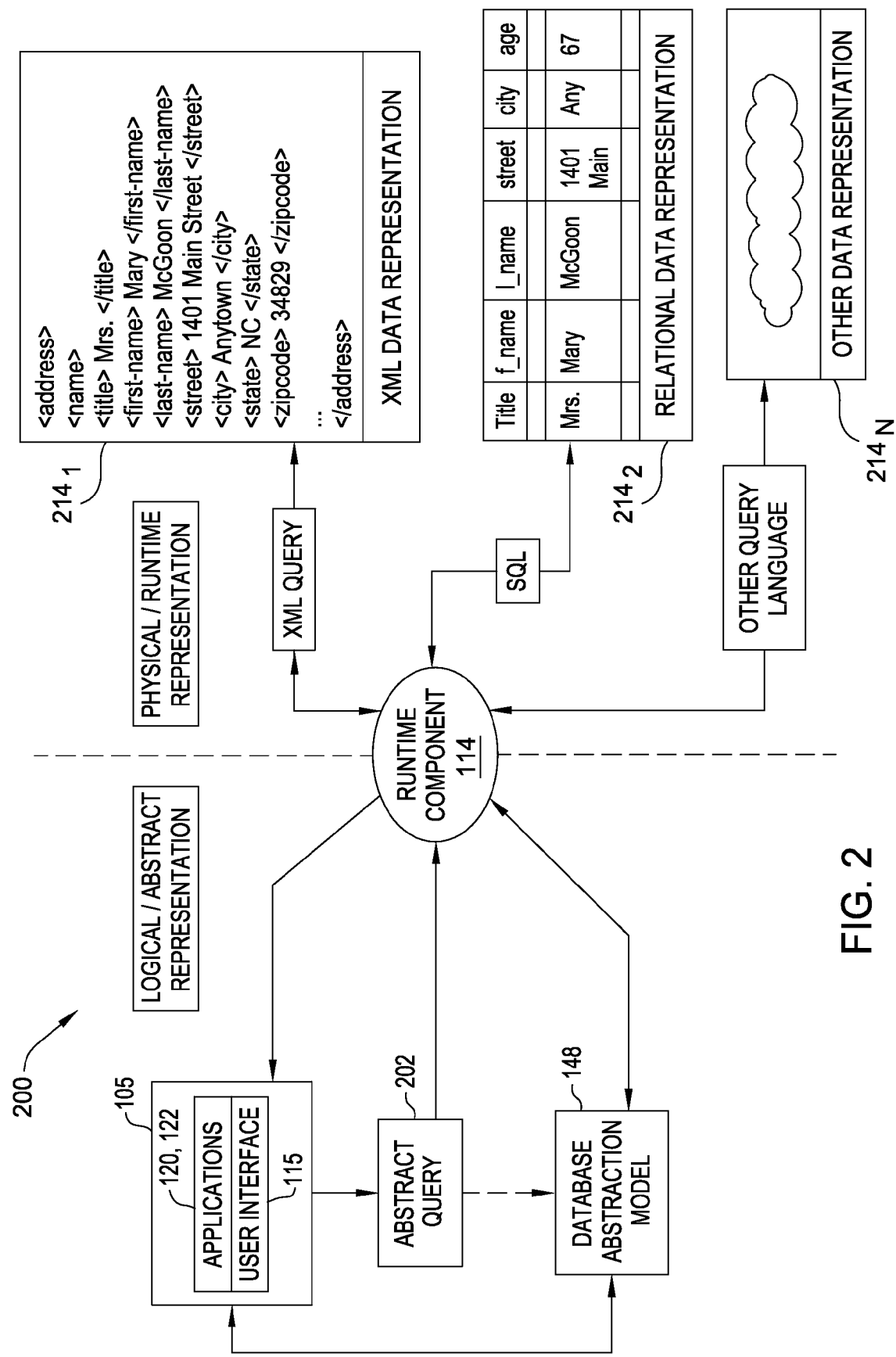
FIG. 2 is a logical view illustrating a database abstraction model constructed over an underlying physical database, according to one embodiment of the invention.

FIG. 2 illustrates a plurality of interrelated components of a database abstraction model, along with relationships between the logical view of data provided by the abstraction model environment (the left side of FIG. 2), and the underlying physical database mechanisms used to store the data (the right side of FIG. 2).

In one embodiment, users compose an abstract query 202 using the user interface 115. An abstract query 202 is generally referred to as "abstract" because it is composed using logical fields rather than direct references to data structures in the underlying physical databases 214. The logical fields include specifications of access methods for mapping to a physical view of the data, including various underlying storage mechanisms. For example, for a given logical field, the runtime component may be generate an XML query that queries data from database 214₁, an SQL query of relational database 214₂, or other query composed according to another physical storage mechanism using "other" data representation 214₃, or combinations thereof (whether currently known or later developed). Particular types of access methods and embodiments for executing abstract queries are further described in commonly assigned U.S. Pat. No. 6,996,558, entitled "Application Portability and Extensibility through Database Schema and Query Abstraction," and commonly assigned, co-pending application titled "Abstract Query Plan," Ser. No. 11/005,418, filed Dec. 6, 2004, both of which are incorporated herein in their entirety.

Figure 3A:
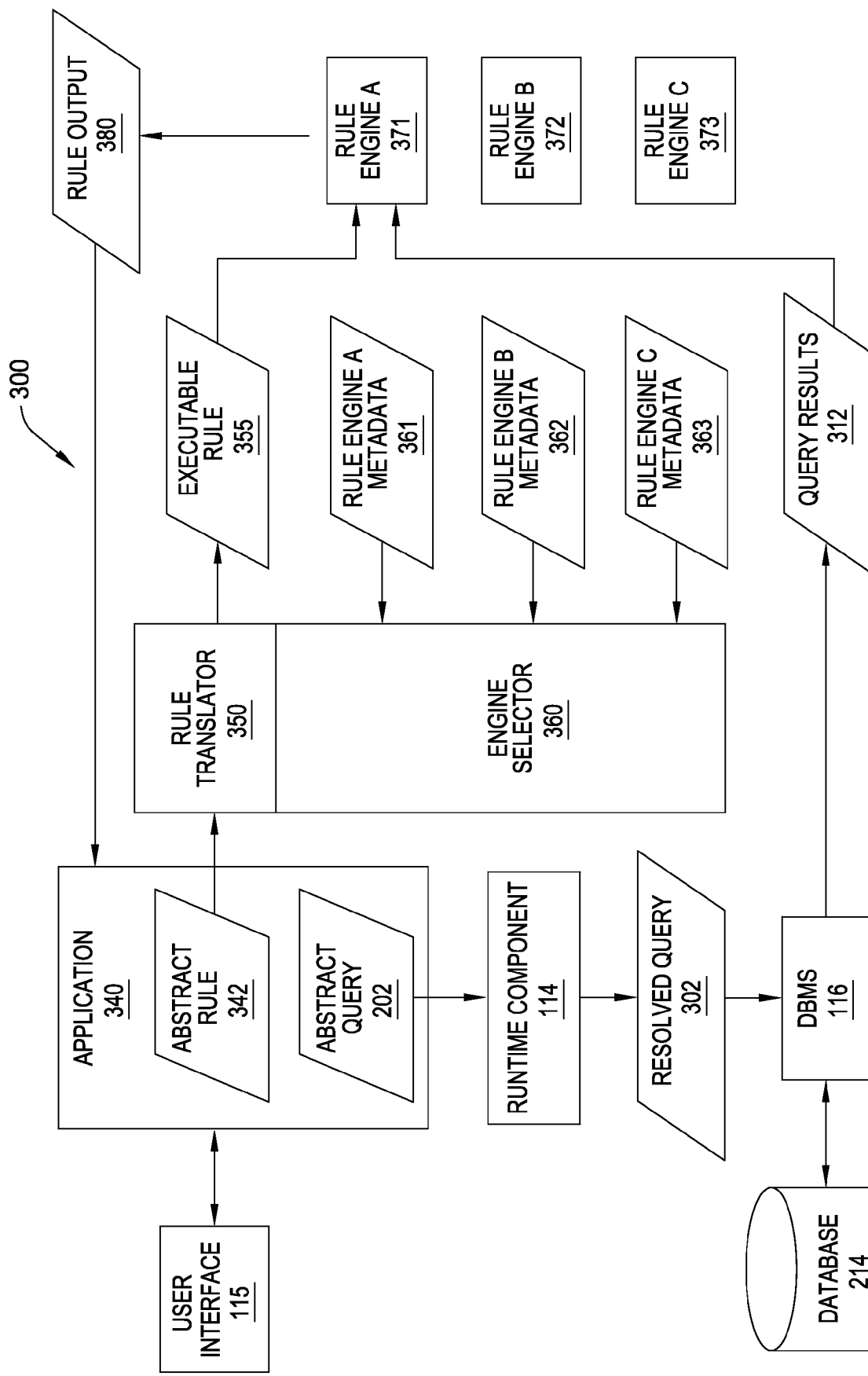
FIGS. 3A-3B illustrate a relational view of software components for selecting rules engines for processing abstract rules based on functionality and cost, according to one embodiment of the invention.

FIG. 3A illustrates a relational view 300 of software components for selecting rule engines for processing abstract rules based on functionality and cost, according to one embodiment of the invention. The software components of relational view 300 include a user interface 115, an application 340, a runtime component 114, a database management system (DBMS) 116, a database 214, a rule translator 350, an engine selector 360, a rule engine A 371, a rule engine B 372, and a rule engine C 373. The three rule engines 371, 372, 373 are shown for illustrative purposes only. Of course, embodiments of the invention may include any number of rule engines. Illustratively, each of the rule engines 371, 372, 373 includes different functionality. That is, each rule engine includes functions that are not included in the other rule engines. The rule engines 371, 372, 373 are respectively described by the rule engine A metadata 361, rule engine B metadata 362, and rule engine C metadata 363.

As shown, the application 340 includes two data objects, an abstract rule 342 and an abstract query 202. Illustratively, the abstract rule 342 and abstract query 202 are created in the user interface 115, which in this example is a graphical user interface. However, it should be noted that the user interface 115 is only shown by way of example; any suitable requesting entity may create abstract rules 342 and abstract queries 202 (e.g., the application 340, an operating system, or an end user). Accordingly, all such implementations are broadly contemplated. As described above, the abstract query 202 is composed by using logical fields to specify query conditions and results fields. Similarly, the abstract rule 342 is composed by using logical fields to specify a rule predicate and a rule action.

In one embodiment, the abstract query 202 is translated by the runtime component 114 into a resolved query 302. The resolved query 302 is submitted to the DBMS 116 for execution against the database 214, thus producing a set of query results 312. The query results 312 include field values which can be used as inputs to an abstract rule 342. However, it should be noted that the present invention is not limited to the use of field values obtained from query results as inputs to the abstract rule 342. Instead, any suitable inputs to the abstract rule 342 are broadly contemplated including, for instance, a user inputting data via the user interface 115.

In one embodiment, the abstract rule 342 is translated into the executable rule 355 by the rule translator 350. As a result of the translation, the executable rule 355 is formatted in the data format required by the rule engine. One example of such a data format is the Arden syntax, which is used in rule engines for medical knowledge. In addition, the executable rule 355 is resolved to the database 214. That is, instead of the logical fields referenced by the abstract rule 342, the executable rule 355 references data structures in the underlying physical database 214.

In one embodiment, there are multiple rule engines available (e.g., rule engines 371, 372, 373), each requiring a different data format. Thus, before the abstract rule 342 can be translated, it must be assigned to one of the rule engines 371, 372, 373 by the engine selector 360. In assigning the abstract rule 342 to a rule engine for processing, the engine selector 360 first identifies the functions required to process the abstract rule 342. Then, the engine selector 360 evaluates the rule engine metadata 361, 362, 363 to determine which rule engines 371, 372, 373 include the required functions. If multiple rule engines can perform the required functions, the assignment is determined by comparing the costs of using each rule engine. A rule engine may have a cost structure defined on the basis of overall use of the rule engine, of use of particular functions, or some other basis. For example, a rule engine that is developed internally by a company may not have any cost associated with its use. Another rule engine may be purchased with an enterprise license that allows unlimited use of all included functions by all employees of a company for a flat fee. Yet another rule engine may be purchased on a Software As A Service (SAAS) basis, in which functions on a remote hosted system are used as required, and the cost is assessed for each use. Yet another rule engine may be purchased with costs based on Central Processing Unit (CPU) utilization.

In one embodiment, a rule engine metadata is a data structure which describes characteristics of a corresponding rules engine. More specifically, a rule engine metadata may include descriptions of how a rule engine can be accessed (i.e., network path, logon name, etc.), of the engine functionality (i.e., the functions included in a given rule engine), and of the associated cost structure. The functionality descriptions in the metadata are normalized across all rule engines. That is, a given function is always described in the metadata with same name, regardless of how it is named in the rule engine itself. By using normalized names, the functionality included in the rule engines can be more easily compared. Of course, a rule engine metadata may include any other descriptions of a rule engine that are of advantage for a given application. An example of rule engine metadata is shown in Table I below. For illustrative purposes, the rule engine metadata is defined using the XML language. However, it is contemplated that other languages may be used instead.

TABLE I

METADATA EXAMPLE

| | |
|---|---|
| 001 | <RulesEngine name="A"> |
| 002 |   <ConnectionData> |
| 003 |     <location="local"> |
| 004 |     <username="sernam"> |
| 005 |   </ConnectionData> |
| 006 |   <Functionality> |
| 007 |     <FunctionGroup name="Statistics"> |
| 008 |     <FunctionGroup name="Aggregation"> |
| 009 |     <FunctionGroup name="FuzzyLogic"> |
| 010 |   </Functionality> |
| 011 |   <CostStructure> |
| 012 |     <Licensetype="PerUse"> |
| 013 |     <Cost="$1.00"> |
| 014 |   </CostStructure> |
| 015 | </RulesEngine > |

The example illustrated in Table I corresponds to the rule engine A metadata 361. As shown, the metadata 361 includes the rule engine name "A" on line 1, which identifies the corresponding rule engine A 371. Lines 2-5 include connection data, which describes how the rule engine A 371 can be accessed. Lines 6-10 describe the functionality included in the rule engine. In this example, the rule engine A 371 includes statistical, aggregation, and fuzzy logic functions. Thus, the rule engine A 371 may be used process rule sets requiring statistical, aggregation, and fuzzy logic functions. Lines 11-14 describe the cost structure for use of rule engine A 371. In this example, the cost is $1.00 per use. Of course, Table I is provided as an illustrative example. It is contemplated that the metadata could include any functions, cost structure, or other information that describes the corresponding rules engine. One aspect of the metadata is that it can be updated as required (e.g., for new functions, new pricing, etc.), without requiring any changes to the other software components of relational view 300. Further, the metadata may be used to determine if certain rules should be hidden from users. That is, if a certain rule requires a function that is not available to a given user, the user may not see the rule as an available option for performing an analysis routine.

In one embodiment, the engine selector 360 may be configured to consider other factors in selecting a rule engine. Such factors may include performance metrics of the available rule engines. For example, if two rules engines are available which can perform the functions in a given abstract rule, the assignment may be given to the rule engine that can process the abstract rule for less cost. However, if the less costly rule engine is already loaded at full capacity (or above some critical threshold), the assignment may be given, in this instance, to the more expensive rule engine.

Referring again to FIG. 3A, the executable rule 355 is processed by the assigned rule engine A 371, using the query results 312 as an input. This processing results in a rule output 380, which is returned to the application 340 for completing analysis routines, such as diagnosis recommendations, drug recommendations, and the like.

It should be noted that, for purposes of illustration, the embodiment illustrated in FIG. 3A is described in terms of a single abstract rule 342. However, it is contemplated that the abstract rule 342 may also represent a set of abstract rules. That is, an abstract rule set may be assigned to a rule engine by the engine selector 360 in the same manner as described above.

Figure 3B:
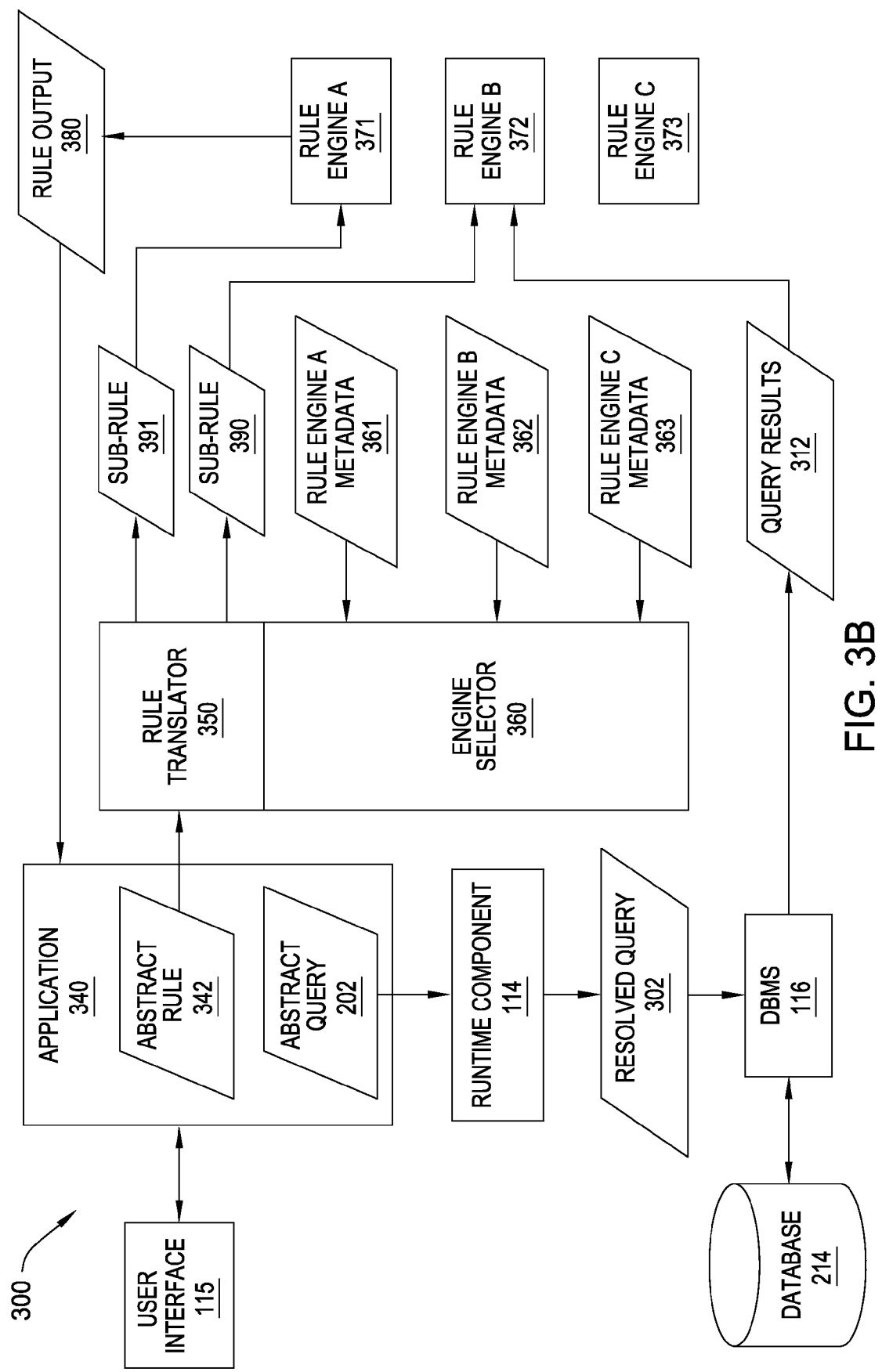

FIG. 3B illustrates the relational view 300 according to another embodiment of the invention. This embodiment differs from the embodiment illustrated in FIG. 3A in that here the rule translator 350 is configured to split the abstract rule 342 into executable sub-rules that are each processed in a separate rule engine. Generally, the predicates (i.e., conditions) that make up an abstract rule may be separated into groupings, or sub-rules, according to the functions they require. Each sub-rule can then be processed in a separate rule engine. The sub-rules are processed in sequential order, with the output of processing one sub-rule being used as input for processing a second sub-rule. Once all sub-rules have been processed, the end result is the same as if the abstract rule had been processed as a whole.

In this illustration, the abstract rule 342 is split into sub-rules 390, 391. As shown, sub-rule 390 is processed by rule engine B, using the query results 312 as an input. Thereafter, sub-rule 391 is processed by rule engine A 371, using the output of rule engine B 372 as an input. By combining the processing of the sub-rules 390, 391 in this way, the rules output 380 is the same as if abstract rule 342 had been processed by a single rule engine. Of course, this example is merely illustrative. It is contemplated that abstract rules may be split into any number of sub-rules required. Generally, this approach may be used if no single rule engine includes all of the functions required, but some combination of rule engines does. In addition, this approach allows rule processing to be optimized with regards to costs. That is, the most expensive rule engines may only be used for processing the functions that are only available on those rule engines.

It should be noted that the components of the relational view 300 are illustratively shown as separate software components. However, embodiments are contemplated in which functionality of any component may be incorporated in another component.

Figure 4:
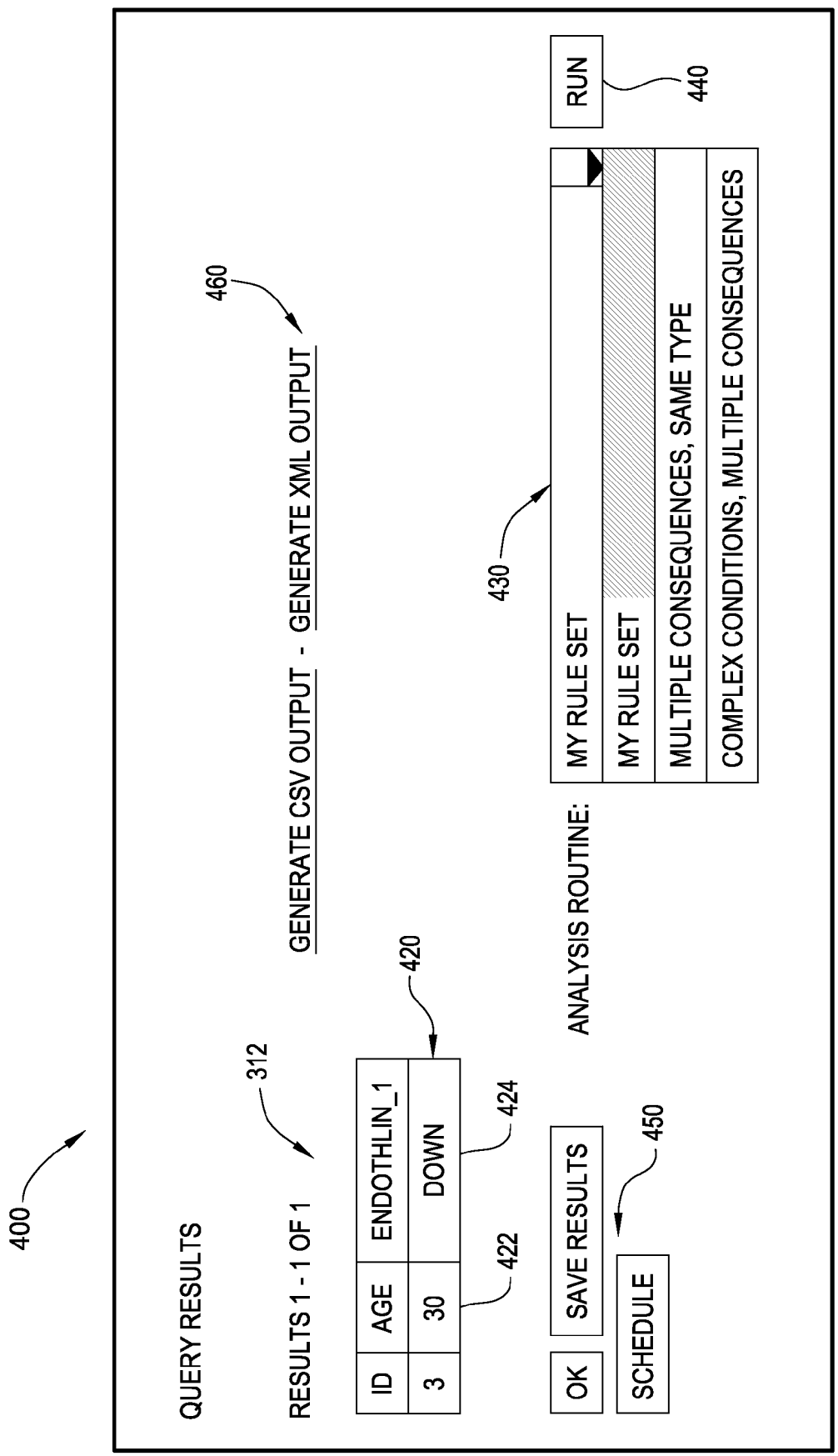
FIG. 4 is a screen shot illustrating selection of an abstract rule set for execution on a query result, according to one embodiment of the invention.

FIG. 4 is a screen shot of a GUI screen 400 illustrating the selection of an abstract rule set for execution on a query result. The GUI screen 400 is shown displaying a query result 312 and a graphical selection element 430 for selection of an analysis routine. By way of example, the query result 312 defines a medical condition of a patient of a medical institution. Assume now that a doctor in the medical institution wants to determine a treatment recommendation for the patient on the basis of the medical condition which is defined by the query result 312.

According to one aspect, the query result 312 was obtained in response to execution of an abstract query (e.g., abstract query 202) against an underlying database (e.g., database 214). Illustratively, the query result 312 includes only a single data record 420 having three different result fields, "ID", "Age" and "Endothlin_1". In the given example, the data record 420 includes a field value 422 "30" for the result field "Age." The data record 420 further includes a field value 424 "Down" for the result field "Endothlin_1." The query result 312 can be stored, deleted or otherwise processed. To this end, the GUI screen 400 illustratively displays suitable pushbuttons 450 which are configured to initiate a requested processing. Furthermore, CSV and/or XML output can be created on the basis of the query result 312 by clicking a corresponding one of displayed hyperlinks 460.

In one embodiment, the query result 312 is used as input to a requested analysis routine that is defined by one or more abstract rule sets. However, it should be noted that in one embodiment, the input to the analysis routine is provided without execution of a query against an underlying database. For instance, the input may be provided by a user using the user interface 115 of FIG. 2. All such different implementations are broadly contemplated.

Illustratively, the requested analysis routine can be selected by selecting an underlying abstract rule set from the graphical selection element 430, which is illustratively implemented as a drop-down list. The drop-down list 430 includes a list of available persistently stored abstract rule sets which can be selected for execution on the query result 312. By way of example, the abstract rule set "My RuleSet" is selected. Assume now that the abstract rule set "My RuleSet" is configured to return a suitable treatment recommendation. Assume further that the doctor in the given medical institution executes the requested analysis routine which is defined by the abstract rule set "My RuleSet" on the query result 312 to determine the treatment recommendation for the given patient. The requested analysis routine is executed on the query result 312 by clicking a pushbutton 440 "RUN".

Of course, the GUI screen 400 is merely illustrated by way of example and that various other implementations are possible. For instance, in one embodiment the user may initially select the requested analysis routine by selecting the underlying abstract rule set from the drop-down list 430. Then, in response to clicking the pushbutton 440 "RUN", a data request form (not shown) may be displayed to the user. The data request form can be configured to guide the user through selections of suitable result fields for an abstract query which are configured to retrieve all field values that are required as inputs to the selected analysis routine. After the user specifies an abstract query using the data request form, the abstract query may be executed and the query result 312 is obtained. The selected analysis routine is then executed on the query result 312 as described above. It should be noted that all such different implementations are broadly contemplated.

Figure 5:
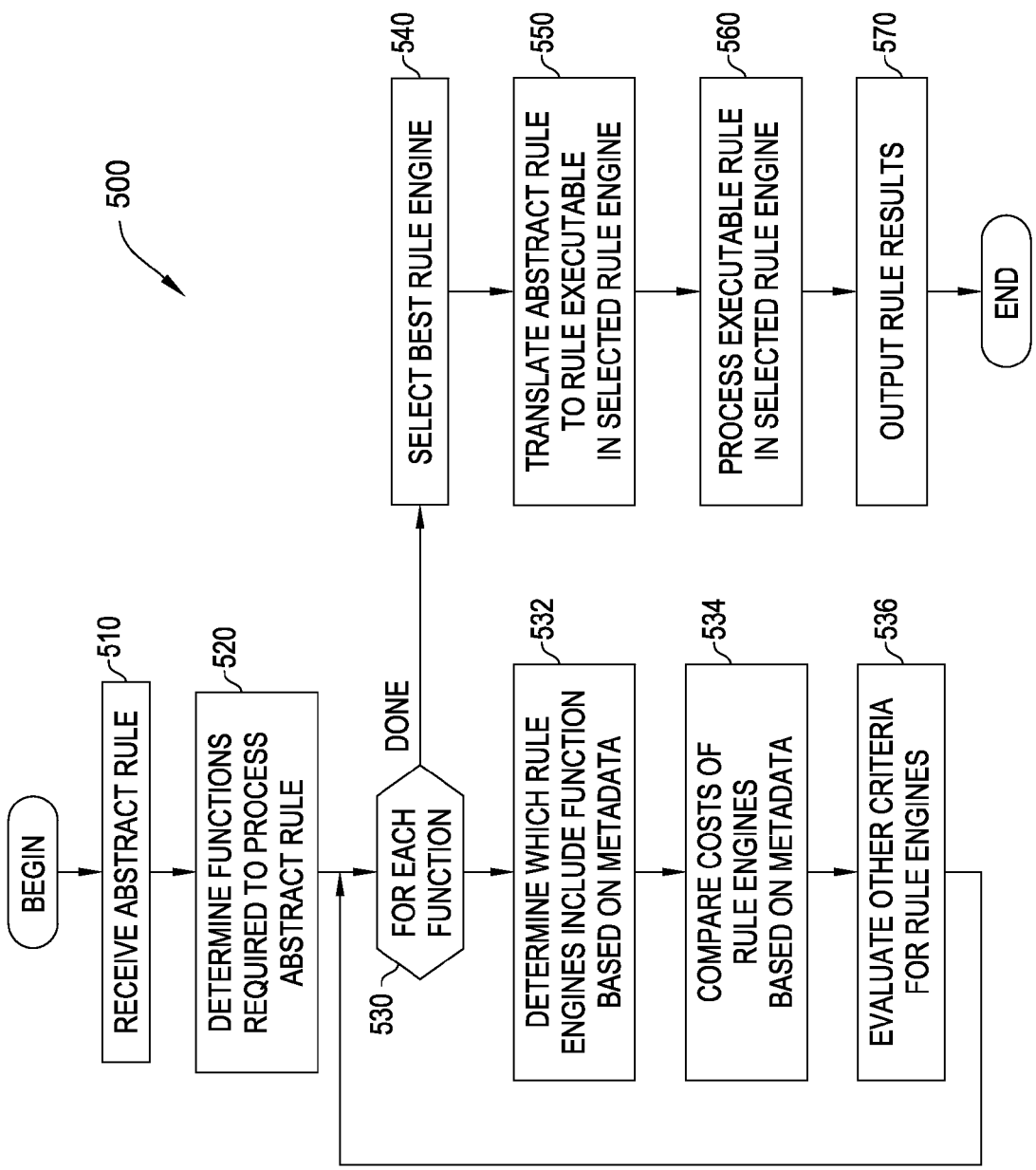
FIG. 5 is a flow diagram illustrating a method for selecting a rules engine for processing an abstract rule based on functionality and cost, according to one embodiment of the invention.

FIG. 5 is a flow diagram illustrating a method 500 for selecting a rule engine for processing abstract rule sets based on functionality and cost. The method 500 begins at step 510, by receiving an abstract rule. For example, abstract rule 342, which may be generated by a user interacting with user interface 115, or by some other entity. At step 520, the functions required to process the abstract rule are determined. This step may be performed, for example, by rule translator 350. Examples of the types of functions required to process an abstract rule include statistical, aggregation, and fuzzy logic functions.

At step 530, the method 500 enters a loop (defined by steps 530, 532, 534, and 536) for processing each function required to process the abstract rule. At step 532, the rule engines that include the function are determined. At step 534, the costs of each rule engine that includes the function are compared. At step 536, any other criteria related to the rule engines are evaluated. The other criteria may include performance metrics, for example the utilization of the available load capacity of the server. The steps 532, 534, and 536 may be performed, for example, by an engine selector 360 evaluating a set of rule engine metadata 361, 362, 363. The rule engine metadata may include descriptions of how a rule engine can be accessed, of the engine functionality (i.e., the functions included in a given rule engine), and of the associated cost structure.

Once all functions are completed at step 530, the method 500 continues to step 540, where the best rule engine is selected (e.g., rule engine A 371 in FIG. 3A). More specifically, the selection is made of the rule engine that includes the required functions, is the least costly in performing the required functions, and best satisfies the remaining criteria. Step 540 may be performed, for example, by the engine selector 360. At step 550, the abstract rule is translated to an executable rule that is formatted for the selected rule engine. That is, the abstract rule is resolved to the physical database (e.g., database 214), and is converted to the data format required by the selected rule engine (e.g., rule engine A 371). This step may be performed, for example, by the rule translator 350. At step 560, the executable rule is processed in the rule engine selected in step 540 (e.g., rule engine A 371). In one embodiment, the executable rule is processed using the query results of an abstract query as an input to the rule. For example, executable rule 355 is processed by rule engine A 371 using query results 312 as input. The method 500 ends at step 570, where the results of the rule processed by the rule engine are output.

Figure 6:
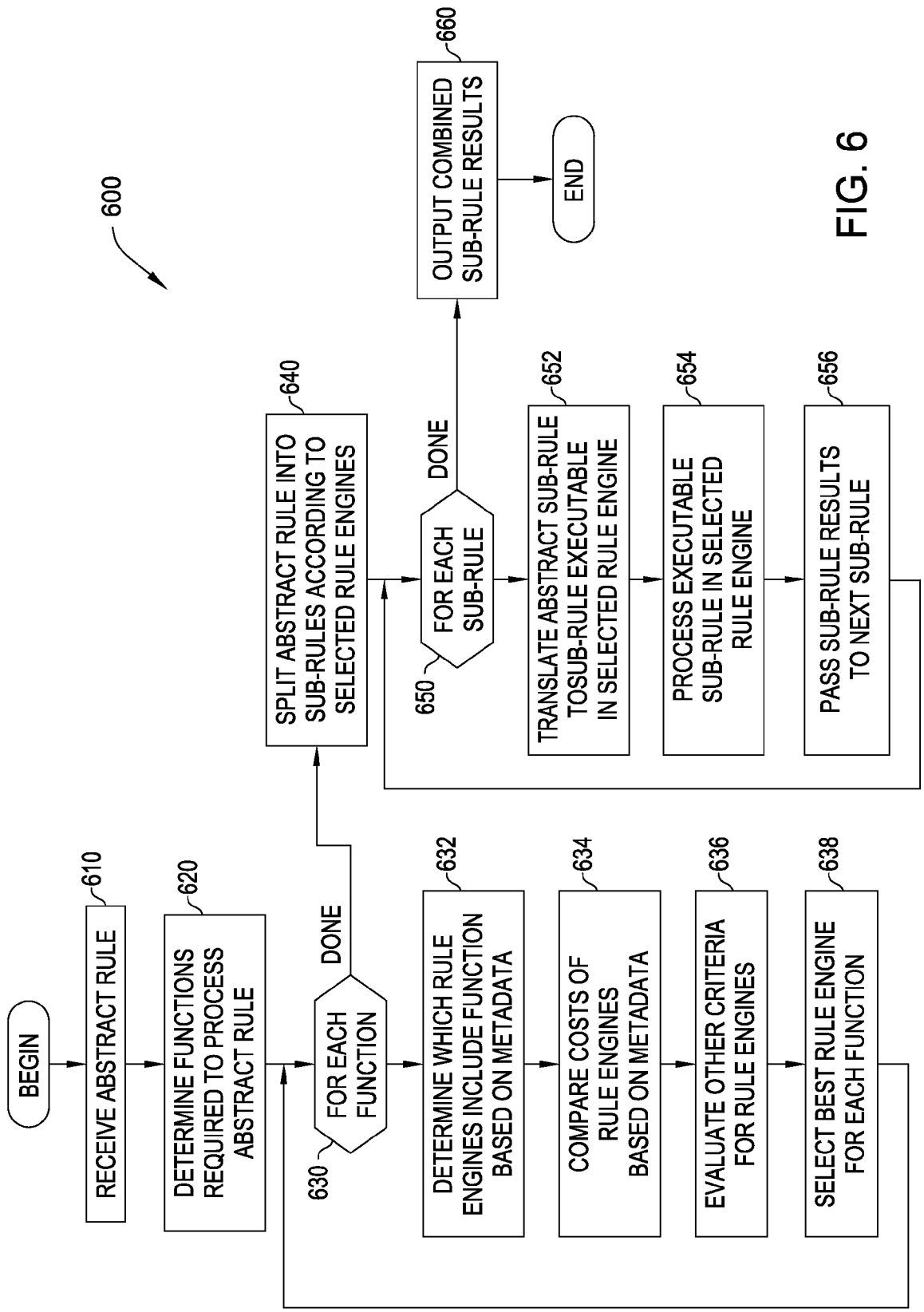
FIG. 6 is a flow diagram illustrating a method for selecting multiple rules engines for processing sub-rules based on functionality and cost, according to one embodiment of the invention.

FIG. 6 is a flow diagram illustrating a method 600 for splitting an abstract rule into sub-rules, and for selecting a rule engine for processing each sub-rule based on functionality and cost. The method 600 begins at step 610, by receiving an abstract rule. For example, abstract rule 342, which may be generated by a user interacting with user interface 115, or by some other entity. At step 620, the functions required to process the abstract rule are determined. This step may be performed, for example, by rule translator 350.

At step 630, the method 600 enters a loop (defined by steps 630, 632, 634, 636, and 638) for processing each function required to process the abstract rule. At step 632, the rule engines that include the function are determined. At step 634, the costs of each rule engine that includes the function are compared. At step 636, any other criteria related to the rule engines are evaluated. The other criteria may include performance metrics, for example the utilization of the available load capacity of the server. At step 638, the best rule engine is selected for each function required to process the abstract rule. The steps 632, 634, 636, and 638 may be performed, for example, by an engine selector 360 evaluating a set of rule engine metadata 361, 362, 363. Once all functions are completed at step 630, the method 600 continues to step 640, where the abstract rule 342 is split into sub-rules (e.g., sub-rules 390, 391) according to the rule engines selected for each sub-rule. That is, the predicates (i.e., conditions) that make up the abstract rule 342 are separated into groupings, or sub-rules, where each sub-rule is processed in a separate rule engine (e.g., rule engines 371, 372 of FIG. 3B).

At step 650, the method 600 enters a loop (defined by steps 650, 652, 654, and 656) for processing each sub-rule. At step 652, the abstract sub-rule is translated to an executable sub-rule that is formatted for the selected rule engine. That is, the abstract sub-rule is resolved to the physical database (e.g., database 214), and is converted to the data format required by the selected rule engine (e.g., rule engine 371). This step may be performed, for example, by the rule translator 350. At step 654, the executable sub-rule is processed by the selected rule engine (e.g., rule engines 371, 372 of FIG. 3B). At step 656, the results of the processing of a sub-rule (i.e., step 654) are passed back to step 650, to be as input for processing the next sub-rule. Once all sub-rules are completed at step 650, the method 600 ends at step 660, where the combined results of processing all sub-rules are output. The output may be the same as, or equivalent to, the output had the abstract rule 342 been processed by a single rule engine. Alternatively, the output may also include other features relative to the abstract rule 342 having been processed by a single rule engine.

While the foregoing is directed to embodiments of the present invention, other and further embodiments of the invention may be devised without departing from the basic scope thereof, and the scope thereof is determined by the claims that follow.

What is claimed is:

1. A computer-implemented method comprising:
 receiving an abstract rule having a conditional statement and a consequential statement, wherein the consequential statement defines a particular recommendation that is returned when the conditional statement is satisfied, and wherein the conditional statement and the consequential statement are defined using logical field definitions defined in an abstraction model that models underlying physical data in a manner making a schema of the physical data transparent to a user of the abstraction model;
 determining one or more functions required to evaluate whether a rule predicate of the conditional statement is satisfied;
 determining one or more rule engines of a plurality of rule engines that include the required functions;
 selecting, from the one or more rule engines determined to include the required functions, a rule engine to process the abstract rule, wherein selecting a rule engine to process the abstract rule comprises determining the rule engine having a lowest cost for processing the required functions; and
 executing the selected rule engine to process the abstract rule and produce an output.

2. The method of claim 1, wherein executing the selected rule engine to process the abstract rule and produce an output comprises:
 transforming the abstract rule into an executable rule;
 processing the executable rule in the selected rule engine; and
 if the conditional statement is resolved to true for the processed executable rule, returning the particular recommendation.

3. The method of claim 2, wherein processing the executable rule comprises:
 selecting one or more field values from a query result set.

4. The method of claim 2, wherein processing the executable rule comprises:
 executing a query against a database;
 receiving a result set for the executed query; and
 determining, from the result set, one or more inputs against which the conditional statement is resolved, wherein the executable rule includes the one or more inputs.

5. The method of claim 2, wherein transforming the abstract rule into an executable rule comprises:
 retrieving a specification of the abstract rule in a first computer-readable language; and
 transforming the specification into a language that is accepted by the selected rules engine.

6. The method of claim 1, wherein determining one or more rule engines that include the required functions comprises evaluating metadata describing properties of the plurality of rule engines.

7. The method of claim 6, wherein selecting a rule engine to process the abstract rule further comprises:
 excluding, from the one or more rule engines determined to include the required functions, any rule engine having an expected performance that is below a pre-determined minimum.

8. The method of claim 1, wherein the lowest cost is a lowest monetary cost.

9. A computer-implemented method comprising:
 receiving an abstract rule having a conditional statement and a consequential statement, wherein the consequential statement defines a particular recommendation that is returned when the conditional statement is satisfied, and wherein the conditional statement and the consequential statement are defined using logical field definitions defined in an abstraction model that models underlying physical data in a manner making a schema of the physical data transparent to a user of the abstraction model;
 determining one or more functions required to evaluate whether a rule predicate of the conditional statement is satisfied;
 determining one or more rule engines of a plurality of rule engines that include the required functions;
 grouping the required functions into two or more groupings;
 selecting, from the one or more rule engines determined to include the required functions, a rule engine to process each grouping of required functions; and
 executing the selected rule engines to produce an output, wherein each selected rule engine processes the abstract rule according to the corresponding grouping of required functions.

10. The method of claim 9, wherein executing the selected rule engines to produce an output comprises:
 transforming each grouping of required functions into an executable sub-rule;
 ordering the executable sub-rules in a sequence so that the output resulting from processing each sub-rule is used as an input for processing the next sub-rule, wherein the output resulting from processing the final sub-rule is the same as the output resulting from processing the abstract rule as a whole by a single rule engine;

processing each executable sub-rule in the corresponding rule engine in accordance with the sequence;

passing the output resulting from processing each executable sub-rule as an input for processing the next executable sub-rule; and if the conditional statement is resolved to true for the output resulting from processing the last executable sub-rule, returning the particular recommendation.

11. The method of claim 9, wherein selecting a rule engine to process each grouping of required functions comprises:

determining the rule engine having a lowest monetary cost for processing the required functions.

12. The method of claim 9, wherein determining one or more rule engines that include the required functions comprises evaluating metadata describing properties of the plurality of rule engines.

13. A computer readable storage medium containing a program which, when executed, performs an operation comprising:

receiving an abstract rule having a conditional statement and a consequential statement, wherein the consequential statement defines a particular recommendation that is returned when the conditional statement is satisfied, and wherein the conditional statement and the consequential statement are defined using logical field definitions defined in an abstraction model that models underlying physical data in a manner making a schema of the physical data transparent to a user of the abstraction model;

determining one or more functions required to evaluate whether a rule predicate of the conditional statement is satisfied;

determining one or more rule engines of a plurality of rule engines that include the required functions;

selecting, from the one or more rule engines determined to include the required functions, a rule engine to process the abstract rule, wherein selecting a rule engine to process the abstract rule comprises determining the rule engine having a lowest cost for processing the required functions; and executing the selected rule engine to process the abstract rule and produce an output.

14. The computer readable medium of claim 13, wherein executing the selected rule engine to process the rule and produce an output comprises:

transforming the abstract rule into an executable rule;

processing the executable rule in the selected rule engine; and if the conditional statement is resolved to true for the processed executable rule, returning the particular recommendation.

15. The computer readable medium of claim 14, wherein processing the executable rule comprises:

selecting one or more field values from a query result set.

16. The computer readable medium of claim 14, wherein processing the executable rule comprises:

executing a query against a database;

receiving a result set for the executed query; and determining, from the result set, one or more inputs against which the conditional statement is resolved, wherein the executable rule includes the one or more inputs.

17. The computer readable medium of claim 14, wherein transforming the abstract rule into an executable rule comprises:

retrieving a specification of the abstract rule in a first computer-readable language; and transforming the specification into a language that is accepted by the selected rules engine.

18. The computer readable medium of claim 13, wherein determining one or more rule engines that include the required functions comprises evaluating metadata describing properties of the plurality of rule engines.

19. The computer readable medium of claim 18, wherein selecting a rule engine to process the abstract rule further comprises:

excluding, from the one or more rule engines determined to include the required functions, any rule engine having an expected performance that is below a pre-determined minimum.

20. The computer readable storage medium of claim 13, wherein the lowest cost is a lowest monetary cost.

21. A computer readable storage medium containing a program which, when executed, performs an operation comprising:

receiving an abstract rule having a conditional statement and a consequential statement, wherein the consequential statement defines a particular recommendation that is returned when the conditional statement is satisfied, and wherein the conditional statement and the consequential statement are defined using logical field definitions defined in an abstraction model that models underlying physical data in a manner making a schema of the physical data transparent to a user of the abstraction model;

determining one or more functions required to evaluate whether a rule predicate of the conditional statement is satisfied;

determining one or more rule engines of a plurality of rule engines that include the required functions;

grouping the functions required to evaluate the conditional statement into two or more groupings;

selecting, from the one or more rule engines determined to include the required functions, a rule engine to process each grouping of required functions; and executing the selected rule engines to produce an output, wherein each selected rule engine processes the rule according to the corresponding grouping of required functions.

22. The computer readable medium of claim 21, wherein executing the selected rule engines to produce an output comprises:

transforming each grouping of required functions into an executable sub-rule;

ordering the executable sub-rules in a sequence so that the output resulting from processing each sub-rule is used as an input for processing the next sub-rule, wherein the output resulting from processing the final sub-rule is the same as the output resulting from processing the abstract rule as a whole by a single rule engine;

processing each executable sub-rule in the corresponding rule engine in accordance with the sequence;

passing the output resulting from processing each executable sub-rule as an input for processing the next executable sub-rule; and if the conditional statement is resolved to true for the output resulting from processing the last executable sub-rule, returning the particular recommendation.

23. The computer readable medium of claim 21, wherein selecting a rule engine to process each grouping of required functions comprises:

determining the rule engine having a lowest monetary cost for processing the grouping of required functions.

24. The computer readable medium of claim 21, wherein determining one or more rule engines that include the required functions comprises evaluating metadata describing properties of the plurality of rule engines.

* * * * *